3,433,680
PLATINUM TYPE ELECTRODE FOR A
SOLID ELECTROLYTE FUEL CELL
David H. Archer and Albert D. Glasser, Pittsburgh, Edward F. Sverdrup, Jeannette, and Herbert L. Taylor, Murrysville, Pa., assignors, by mesne assignments, to the United States of America as represented by the Secretary of the Interior
No Drawing. Filed Jan. 31, 1967, Ser. No. 613,056
U.S. Cl. 136—120
Int. Cl. H01m 27/10
9 Claims

ABSTRACT OF THE DISCLOSURE

Platinum is fused to a solid electrolyte in a reducing atmosphere to form fuel electrode.

---

This invention relates to solid electrolyte fuel cells employing any of the platinum metals as the fuel electrode, and a process for making such an electrode.

At present platinum fuel electrodes for solid electrolyte fuel cells are made by coating the electrolyte with a layer of platinum paste (finely divided platinum suspended in an organic vehicle) or a platinum compound such as platinum chloride or platinum resinate; heating the coated electrolyte to the temperature required to drive off the vehicle (or decompose the platinum compound), and to sinter the coating to the electrolyte. To achieve desired thicknesses, the electrodes can be applied in one or more successive layers.

At present the lives of platinum electrode solid electrolyte fuel cell batteries are limited to a few hours at very high current densities because these fuel electrodes cease to function. For example, in a system under current densities of 600 milliamps per square centimeter the platinum electrodes fail after 50 to 750 hours.

It has now been discovered that an improved electrode can be made by applying the platinum (or any of the other platinum metals) in molten form to the solid electrolyte in a reducing atmosphere. The bond between the electrolyte and electrode is strengthened by the production technique, and, apparently, this stronger bond enhances the operational characteristics of the electrode.

It is therefore an object of this invention to provide a fuel electrode for solid electrolyte fuel cells that is capable of withstanding very hot current densities.

Another object is to provide a strong bond between a solid electrolyte and any of the platinum metals such as rhodium, palladium, iridium, osmium and ruthenium.

In accordance with the practice of this invention, a commercial platinum paste made by, for example, suspending particles of platinum, 300 mesh or smaller, in an organic vehicle, is sprayed by means of an artist's air brush onto a degreased surface of a ceramic electrolyte composed of calcia, or yttria-stabilized zirconia. The electrolyte can be shaped in many convenient forms including discs, tubes, rectangular plates, etc. Degreasing is accomplished by washing with an organic solvent and/or aqua regia, and provides a surface to which the platinum coating will more readily adhere. After spraying, the article is fired in air in, for example, an electric or muffle furnace, to a temperature within the range of about 600° C. to about 1300° C., preferably about 100° C. After being held at the firing temperature for about an hour, the article is slowly cooled to room temperature. This initial heating operation acts to drive off the organic vehicle and sinter the particulate platinum to the electrolyte.

Next, the coated article is placed in a susceptor in a high frequency induction furnace. A susceptor composed of molybdenum or tantalum is suitable. Any furnace capable of heating the electrode and electrolyte to the required platinum fusion temperature could be employed. To purge the furnace chamber of undesirable gases, it is flushed with an inert gas such as argon or helium, after which it is filled with a reducing gas such as hydrogen and/or carbon monoxide to an absolute pressure above about 5 microns of mercury at room temperature, preferably about 200 microns. Then the chamber is sealed. Immediately prior to adding the reducing gas, the chamber can be flushed with reducing gas. The coated articles are then heated to a temperature of about 1750° C. to about 2700° C., preferably 1800° C., to fuse the platinum, and held at that temperature for a period of time ranging from about 10 seconds to about 30 minutes. Finally, the article is allowed to cool in the furnace to solidify the platinum. A platinum coating density within the range of about 3 milligrams to about 30 milligrams per square centimeter yields a satisfactory electrode.

Increasing the length of time the platinum is held in a melted state increases the penetration of platinum into the solid electrolyte. It also increases the amount of platinum that vaporizes and deposits elsewhere in the chamber. For example, a ten minute high temperature cycle has resulted in the average loss of 1.3 milligrams of platinum per square centimeter of electroded area whereas a 30 minute cycle has resulted in the loss of 2.6 milligrams per square centimeter.

Methods other than paste spraying and sintering could be employed to form the initial coating of platinum on the electrolyte. For example, paste spraying followed by vacuum evaporation of the organic vehicle could be used. Alternatively, the platinum could be applied in the form of a compound and subsequently decomposed. Prior to the fusion step, it is only necessary that the platinum be on the surface of the electrolyte in a state suitable for melting under the operating conditions.

If any of the other platinum metals are employed, as will be apparent to those skilled in this art, firing and fusing temperatures are varied in accordance with the properties of the particular metal.

Tests show that solid electrolyte fuel cells having platinum fuel electrodes made by the process of this invention will operate for over a month under current densities greater than 800 milliamps per square centimeter of electroded surface, with low polarization voltage losses. Although the costs of platinum type electrodes are high, the electrode of the present invention is useful in special purpose applications where cost is secondary to the light weight, low volume, and high efficiency obtainable from the solid electrolyte fuel cell.

While the particular process and resultant electrode herein described are well adapted to carry out the objects of the present invention, it is to be understood that various modifications and changes may be made all coming within the scope of the following claims.

What is claimed is:

1. A process for making a fuel electrode for a solid electrolyte fuel cell comprising:
    (a) forming a coating of elemental platinum metal onto a surface of a solid ceramic electrolyte;
    (b) melting said platinum metal on a surface of said solid electrolyte in a fusion zone in a reducing atmosphere;
    (c) maintaining said metal in a molten condition for a period of time in said reducing atmosphere to allow some of said metal to penetrate said surface; and
    (d) allowing said melted metal to solidify.

2. The process of claim 1 wherein said reducing atmosphere is selected from the group consisting of a hydrogen atmosphere, a carbon monoxide atmosphere, and a hydrogen-carbon monoxide atmosphere.

3. The process of claim 1 wherein said step of forming said coating comprises, spraying said metal as a paste containing an organic vehicle onto said solid electrolyte and removing said vehicle to form a metal coating on said electrolyte.

4. The process of claim 3 wherein said reducing atmosphere is established by filling said fusion zone, prior to said melting step, with hydrogen at an absolute pressure above about 5 microns of mercury at room temperature, after which said zone is sealed.

5. The process of claim 1 wherein said step of forming said coating comprises, applying said metal to said solid electrolyte as a compound, and decomposing said applied compound to form a metal coating on said electrolyte.

6. The process of claim 1 wherein said metal is a platinum.

7. The process of claim 2 wherein said metal is platinum.

8. The process of claim 3 wherein said metal is platinum.

9. The electrode produced by the process of claim 1.

References Cited

UNITED STATES PATENTS

| | | | |
|---|---|---|---|
| 3,152,014 | 10/1964 | Berger et al. | 136—86 |
| 3,228,797 | 1/1966 | Brown et al. | 136—86 |
| 3,257,239 | 6/1966 | Shultz et al. | 136—86 |
| 3,309,231 | 3/1967 | Hess | 136—122 |
| 3,350,232 | 10/1967 | Ryhiner et al. | 136—120 XR |

A. B. CURTIS, *Primary Examiner.*

A. SKAPARS, *Assistant Examiner.*